L. YALE, Jr., dec'd.

YALE LOCK MANUFACTURING CO, assignee of S. N. BROOKS, administrator.

Lock for Post Office Boxes.

No. 9,666. Reissued April 12, 1881.

Yale Lock Manf'g. Co.
Assignees of the

WITNESSES

Wm A Skinkle
Jos. S. Lehmer

INVENTOR

Linus Yale Jr Dec'd

By their Attorneys

Baldwin, Hopkins & Peyton.

UNITED STATES PATENT OFFICE.

THE YALE LOCK MANUFACTURING COMPANY, OF STAMFORD, CONNECTICUT ASSIGNEE OF SILAS N. BROOKS, ADMINISTRATOR OF LINUS YALE, JR., DECEASED.

LOCK FOR POST-OFFICE BOXES.

SPECIFICATION forming part of Reissued Letters Patent No. 9,666, dated April 12, 1881.

Original No. 120,177, dated October 24, 1871. Application filed February 9, 1881.

DIVISION B.

*To all whom it may concern:*

Be it known that LINUS YALE, Jr., deceased, late of Shelburne Falls, in the county of Franklin and State of Massachusetts, during his lifetime invented a new and useful Improvement in Locks Specially Designed for the Doors of Post-Office Boxes, of which the following is a specification, reference being had to the accompanying drawings, in which—

Figure 1:
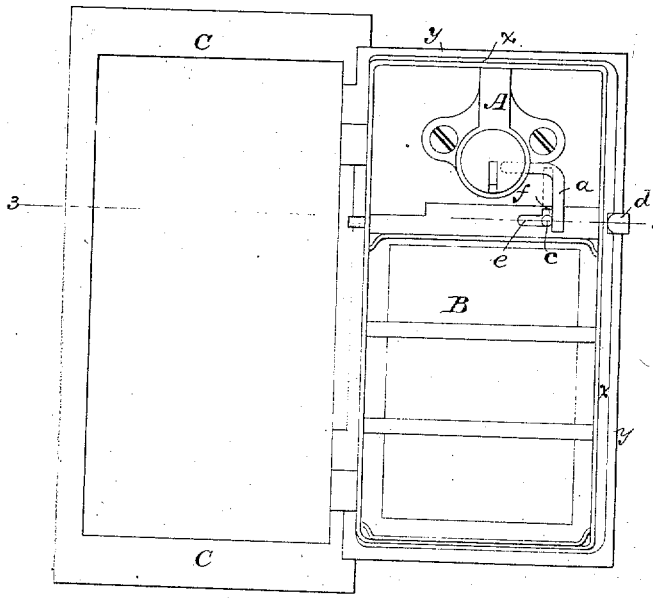
Figure 3:
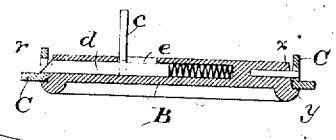
Figure 2:
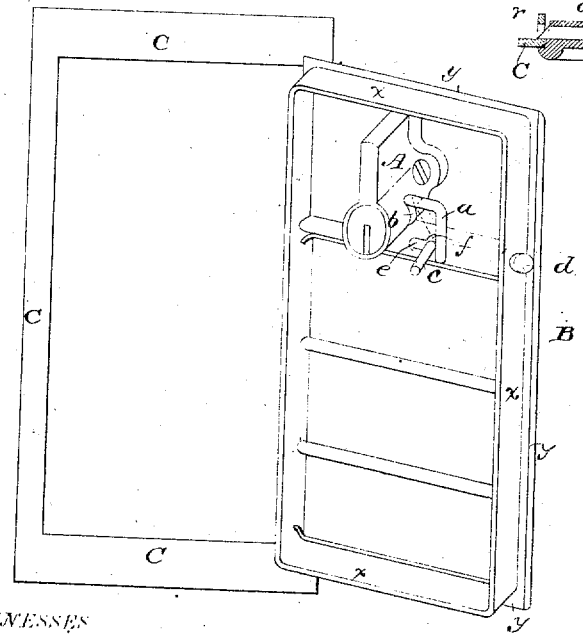

Figure 1 is a view of an open door of a post-office box hinged to its frame and having a lock and bolt applied according to this invention. Fig. 2 is a similar view, showing the door partly opened and the lock and bolt in perspective; and Fig. 3 is a sectional view on the line 3 3 of Fig. 1 when the door is closed.

The improvements of the said LINUS YALE, Jr., deceased, in locks for post-office boxes are specially designed for the improved metallic doors and frames described in Letters Patent No. 119,212. reissued No. 8,783; and they consist of devices operating in connection with such a door and its frame for locking the door to the frame from within, whereby all access to the box from without is prevented, the devices being such as hereinafter more fully set forth, and as particularly specified in the claims.

In carrying out this invention a lock, A, is used, which may be of the construction shown in Letters Patent No. 274, of January 29, 1861, or No. 48,475, of June 27, 1865, granted to said LINUS YALE, Jr., deceased. This lock is attached to the metallic door B, so that when the door is closed its lock-bolt *d* may be shot into a recess, *r*, in the frame C, to lock the door.

It will be observed that the door is so constructed and applied to the frame that the part *x* enters within the frame, and the part *y* overlaps it when the door is shut. On account of this construction (which, however, is not claimed in this patent) the door cannot be lifted from its hinges when shut; and, furthermore, and a matter of importance to the present invention, the lock-bolt *d* passing through the part *x* is carried so far inward by the closing of the door as to be in position to enter the recess *r* in the frame C, as already described. Thus it will be perceived that this organization of the lock, the metallic door, and the metallic frame for use in connection with post-office letter-boxes effects perfect security, the frame operating as the bolt-keeper.

An arm, *a*, of wire or other material is attached to the turning mechanism of the lock through a slot, *b*, made in the casing in which the tumblers, &c., of the lock are placed. This arm is bent at its free end and engages with a pin, *c*, which is attached to the bolt *d*. The casing of this bolt is slotted horizontally at *e* and vertically at *f*, in which slots the pin *c* moves to push out and draw in the bolt, and to lock it when pushed or thrown out.

The locking and unlocking of the door is accomplished from within by means of the arm and pin independently of the key in the following manner: The parts being in the position shown in Figs. 1 and 2, the key is turned, and the arm *a* is caused to move in an arc of a circle, the slot limiting its movement so that it strikes against the pin *c* and moves it back in the slot, and, of course, draws the bolt with it, thus unlocking the door. It may be locked by simply pushing it, or, preferably, by turning the key. If the pin *c* be turned up into the vertical slot *f*, it will be impossible for any outsider to unlock the door, even though he have the key; and thus, as will appear, the postmaster will have complete control over the boxes from within. This is a very useful contrivance, since it prevents access to the boxes in case of the loss of the key, or in any other cases where the postmaster may desire it.

What is claimed as the invention of said LINUS YALE, Jr., deceased, is—

1. The combination of the pin *c*, attached to the bolt *d*, and operating in slots *e f* in the bolt-case, with the bent arm *a* of the lock, the combination and arrangement being substantially as described, and for the purpose specified.

2. The combination, substantially as hereinbefore described, of a metallic frame applicable to the end of a post-office box, a metallic door hinged to such frame and partly entering and partly overlapping the same when shut, and a lock-bolt carried within the frame, which serves as its keeper, by the closing of the door, and provided with different means to lock and unlock it on opposite sides of the door, for the purpose specified.

THE YALE LOCK MFG. CO.,
By HENRY R. TOWNE,
*President.*

Witnesses:
SCHUYLER MERRITT,
E. D. OGDEN, Jr.